United States Patent
Vitale et al.

(10) Patent No.: US 6,998,458 B2
(45) Date of Patent: Feb. 14, 2006

(54) BUTENE-1 (CO)POLYMERS AND PROCESS FOR THEIR PREPARATION

(75) Inventors: Gianni Vitale, Ferrara (IT); Giampiero Morini, Padua (IT); Giuliano Cecchin, Ferrara (IT)

(73) Assignee: Basell Poliolefine Italis S.p.A., Milan (IT)

( * ) Notice: Subject to any disclaimer, the term of this patent is extended or adjusted under 35 U.S.C. 154(b) by 0 days.

(21) Appl. No.: 10/490,097

(22) PCT Filed: Apr. 7, 2003

(86) PCT No.: PCT/EP03/03593

§ 371 (c)(1),
(2), (4) Date: Mar. 17, 2004

(87) PCT Pub. No.: WO03/099883

PCT Pub. Date: Dec. 4, 2003

(65) Prior Publication Data

US 2004/0254313 A1    Dec. 16, 2004

(30) Foreign Application Priority Data

May 29, 2002   (EP)   .................................. 02077095

(51) Int. Cl.
*C08F 10/04* (2006.01)
(52) U.S. Cl. ................ 526/348.6; 526/123.1; 526/124.1; 526/124.3; 526/348
(58) Field of Classification Search ............ 526/123.1, 526/124.1, 124.3, 348, 348.6
See application file for complete search history.

(56) References Cited

U.S. PATENT DOCUMENTS

| | | | |
|---|---|---|---|
| 4,220,554 A | 9/1980 | Scatá et al. | 252/429 B |
| 4,298,718 A | 11/1981 | Mayr et al. | 526/125 |
| 4,399,054 A | 8/1983 | Ferraris et al. | 252/429 B |
| 4,469,648 A | 9/1984 | Ferraris et al. | 264/9 |
| 4,495,338 A | 1/1985 | Mayr et al. | 526/125 |

FOREIGN PATENT DOCUMENTS

| | | | |
|---|---|---|---|
| EP | 0 172 961 | * | 3/1986 |
| EP | 0172961 | | 3/1986 |
| EP | 0395083 | | 10/1990 |
| EP | 0553805 | | 8/1993 |
| EP | 0553806 | | 8/1993 |
| EP | 0601525 | | 6/1994 |
| WO | 9844001 | | 10/1998 |
| WO | 9945043 | | 9/1999 |
| WO | 0063261 | | 10/2000 |
| WO | 0202659 | | 1/2002 |

OTHER PUBLICATIONS

T. Asakura et al., "Carbon-13 NMR Spectral Assignment of Five Polyolefins Determined from the Chemical Shift Calculation and the Polymerization Mechanism," *Macromolecules*, vol. 24(9), p. 2334-2340 (1991).

R. Chûjô et al., "Two-site model analysis of $^{13}$C n.m.r. of polypropylene polymerized by Ziegler-Natta catalyst with external alkoxysilane donors," *Polymer*, vol. 35(2), p. 339-342 (1994).

\* cited by examiner

*Primary Examiner*—Ling-Sui Choi
(74) *Attorney, Agent, or Firm*—William R. Reid

(57) ABSTRACT

The present invention relates to butene-1 homopolymers, or copolymers containing up to 20% by weight of alpha olefins having from 2 to 10 carbon atoms other than butene-1, characterized by the following properties: (i) a Molecular Weight Distribution (MWD) in terms of Mw/Mn, measured by GPC analysis according to the method specified, of lower than 6; and (ii) a melt strength (measured according to the method specified below) higher than 2.8.

20 Claims, No Drawings

BUTENE-1 (CO)POLYMERS AND PROCESS FOR THEIR PREPARATION

This application is the U.S. national phase of International Application PCT/EP03/03593, filed Apr. 7, 2003.

The present invention relates to butene-1 (co)polymers and to a process for their preparation. The invention further relates to the articles obtained from the butene-1 (co) polymers of the invention. In particular the present invention relates to butene-1 (co)polymers characterized by a specific set of chemical and physical properties.

Butene-1 (co)polymers are well known in the art. In view of their good properties in terms of pressure resistance, creep resistance, and impact strength they are mainly used in the manufacture of pipes to be used in the metal pipe replacement. Despite their good properties, the performances of butene-1 articles, and in particular pipes, sometimes resulted to be not completely satisfactory in terms of general mechanical performances and in particular with respect to pressure resistance after long times (1000 Hrs Burst Stress). Therefore, it would be desirable to improve said butene-1 (co)polymers, so as to have articles (in particular pipes) having a set of mechanical properties capable to provide both long time pressure resistance and easy workability.

The butene-1 (co)polymers can be prepared by polymerizing butene-1 in the presence of $TiCl_3$ based catalysts components together with diethylaluminum chloride (DEAC) as cocatalyst. In some cases diethyl aluminum iodide (DEAI) is also used in mixtures with DEAC. The polymers obtained, however, generally do not show satisfactory mechanical properties. Furthermore, in view of the low yields obtainable with the $TiCl_3$ based catalysts, the polybutenes prepared with these catalysts have a high content of catalyst residues (generally more than 300 ppm of Ti) which lowers the properties of the polymers making it necessary a deashing step.

Butene-1 (co)polymers can also be obtained by polymerizing the monomers in the presence of a stereospecific catalyst comprising (A) a solid component comprising a Ti compound and an electron-donor compound supported on $MgCl_2$; (B) an alkylaluminum compound and, optionally, (C) an external electron-donor compound.

A process of this type is disclosed in EP-A-172961.This process allows the preparation of butene-1 polymers having an intrinsic viscosity [η] of from 1.5 to 4, as measured in decalin at 135° C., an isotacticity value of at least 95% and a Molecular Weight Distribution (MWD), expressed in terms of Mw/Mn, of not more than 6.The melt strength of the polymer was not reported. The applicant has replicated the preparation of the polybutenes (example 1) described in the said application and has determined the melt strength that is resulted to be 2.5 g. The mechanical properties shown by the polymers disclosed in said application are not completely satisfactory especially in terms of long times pressure resistance.

In WO 99/45043 a butene-1 having high crystallinity and a broad molecular weight distribution is described. The polymer is obtained by sequential polymerization in two reactors under different conditions in the presence of a stereospecific $MgCl_2$ supported catalyst thereby obtaining MWD of 8 or higher. In the Example 1 of this patent application, where the MWD is very broad (10.3), the 1000 Hrs Burst Stress is good (8.2 MPa) but the Flexural Modulus is so high (570 Mpa) that the workability of the articles (especially pipes) is limited. On the other hand, when the MWD is lower (Example 2 Mw/Mn 8) the Flexural Modulus reaches much lower values which also impact the long times pressure resistance (1000 Hrs Burst Stress drops to 7.3).

The applicant has now discovered butene-1 (co)polymers that, although characterized by a medium/narrow MWD, are surprisingly capable to couple suitable mechanical properties and long times pressure resistance.

It is therefore an object of the present invention to provide butene-1 homopolymers, or copolymers containing up to 20% by weight of α-olefins having from 2 to 10 carbon atoms other than butene-1, characterized by the following properties:

(i) a Molecular Weight Distribution (MWD) in terms of Mw/Mn, measured by GPC analysis according to the method specified below, of lower than 6; and (ii) a melt strength (measured according to the method specified below) higher than 2.8 g.

The butene-1 (co)polymers of the invention preferably have a MWD in the range 4–5.8 more preferably in the range 4.5–5.5. It is especially preferred that in correspondence of such values of MWD the isotactic index, expressed in terms of isotactic pentads (mmmm %) measured by NMR, is higher than 97 and more preferably higher than 98.5 and most preferably higher than 99. The melt strength is preferably higher than 3 g and more preferably higher than 3.5. As explained above, also copolymers of butene-1 containing up to 20% by weight of α-olefins, provided that they fulfill the above conditions, are within the scope of the present invention. Among the α-olefins different from butene particularly preferred are those selected from the group consisting of ethylene, propylene and hexene-1. The copolymers of the present invention preferably contain from 2 to 15% by weight of such olefins and more preferably from 5 to 10% by weight.

While there is no particular limitation as to the molecular weight of the polymers, it is preferred that the (co)polymers have a Mw such that the Melt Index "E" is comprised in the range of from 100 to 0.01, more preferably from 10 to 0.1. In particular, when the polymers are used in the extrusion devices for the manufacture of pipes, polymers having a Melt Index in the range of from 1 to 0.1 and particularly from 0.2 to 0.6 are preferred.

The polymers of the present invention can be prepared by polymerization of the monomers in the presence of a stereospecific catalyst comprising (A) a solid component comprising a Ti compound and an internal electron-donor compound supported on $MgCl_2$; (B) an alkylaluminum compound and, optionally, (C) an external electron-donor compound.

Magnesium dichloride in active form is preferably used as a support. It is widely known from the patent literature that magnesium dichloride in active form is particularly suited as a support for Ziegler-Natta catalysts. In particular, U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$, where n is the valence of titanium and y is a number between 1 and n, can be used.

The internal electron-donor compound is preferably selected from esters and ethers, and more preferably from alkyl, cycloalkyl or aryl esters of monocarboxylic acids, for example benzoic acids, or polycarboxylic acids, for example phthalic or succinic acids, the said alkyl, cycloalkyl or aryl groups having from 1 to 18 carbon atoms. Examples of the said electron-donor compounds are methyl benzoate, ethyl benzoate, diisobutyl phthalate and 2,3-alkyl disubstituted succinates.

The preparation of the solid catalyst component can be carried out according to several methods.

According to one of these methods, the magnesium dichioride in an anhydrous state and the internal electron donor compound are milled together under conditions in which activation of the magnesium dichioride occurs. The so obtained product can be treated one or more times with an excess of $TiCl_4$ at a temperature between 80 and 135° C. This treatment is followed by washings with hydrocarbon solvents until chloride ions disappear. According to a further method, the product obtained by co-milling the magnesium chloride in an anhydrous state, the titanium compound and the internal electron donor compound is treated with halogenated hydrocarbons such as 1,2-dichioroethane, chlorobenzene, dichioromethane etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is preactivated according to well known methods and then treated with an excess of $TiCl_4$ at a temperature of about 80 to 135° C. which contains, in solution, an internal electron donor compound. The treatment with $TiCl_4$ is repeated and the solid is washed with hexane in order to eliminate any non-reacted $TiCl_4$.

A further method comprises the reaction between magnesium alcoholates or chloroalcoholates (in particular chloroalcoholates prepared according to U.S. Pat. No. 4,220,554) and an excess of $TiCl_4$ comprising the internal electron donor compound in solution at a temperature of about 80 to 120° C.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1–18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100–130° C.). Then, the emulsion is quickly quenched, Thereby causing the solidification of the adduct in form of spherical particles. Examples of spherical adducts prepared according to this procedure are described in U.S. Pat. No.4,399,054 and U.S. Pat. No. 4,469,648. The so obtained adduct can be directly reacted with the Ti compound or it can be previously subjected to thermal controlled dealcoholation (80–130° C.) so as to obtain an adduct in which the number of moles of alcohol is generally lower than 3 preferably between 0.1 and 2.5. The reaction with the Ti compound can be carried out by suspending the adduct (dealcoholated or as such) in cold $TiCl_4$ (generally 0° C.); the mixture is heated up to 80–130° C. and kept at this temperature for 0.5–2 hours. The treatment with $TiCl_4$ can be carried out one or more times. The internal electron donor compound can be added during the treatment with $TiCl_4$. The treatment with the electron donor compound can be repeated one or more times.

The preparation of catalyst components in spherical form is described for example in European Patent Applications EP-A-395083, EP-A-553805, EP-A-553806, EPA-601525 and WO98/44001.

The solid catalyst components obtained according to the above method show a surface area (by B.E.T. method) generally between 20 and 500 $m^2/g$ and preferably between 50 and 400 $m^2/g$, and a total porosity (by B.E.T. method) higher than 0.2 $cm^3/g$ preferably between 0.2 and 0.6 $cm^3/g$. The porosity (Hg method) due to pores with radius up to 10.000 Å generally ranges from 0.3 to 1.5 $cm^3/g$, preferably from 0.45 to 1 $cm^3/g$.

A further method to prepare the solid catalyst component of the invention comprises halogenating magnesium dihydrocarbyloxide compounds, such as magnesium dialkoxide or diaryloxide, with solution of $TiCl_4$ in aromatic hydrocarbon (such as toluene, xylene etc.) at temperatures between 80 and 130° C. The treatment with $TiCl_4$ in aromatic hydrocarbon solution can be repeated one or more times, and the internal electron donor compound is added during one or more of these treatments.

Generally, the internal electron donor compound is used in molar ratio with respect to the $MgCl_2$ of from 0.01 to 1 preferably from 0.05 to 0.5.

The alkyl-Al compound (B) is preferably chosen among the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

The external donor (C) can be of the same type or it can be different from the internal donor described above. Suitable external electron donor compounds include silicon compounds of formula $R_a^5 R_b^6 Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1–18 carbon atoms optionally containing heteroatoms. Particularly preferred are the silicon compounds in which a is 1, b is 1, c is 2, at least one of $R^5$ and $R^6$ is selected from branched alkyl, cycloalkyl or aryl groups with 3–10 carbon atoms optionally containing heteroatoms and $R^7$ is a $C_1$–$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane, diisopropyldimethoxysilane, 2-ethylpiperidinyl-2-t-butyldimethoxysilane and 1,1,1, fluoropropyl-2ethylpiperidinyl-dimethoxysilane. Moreover, are also preferred the silicon compounds in which a is 0, c is 3, $R^6$ is a branched alkyl or cycloalkyl group, optionally containing heteroatoms, and $R^7$ is methyl. Examples of such preferred silicon compounds are cyclohexyltrimethoxysilane, t-butyltrimethoxysilane and thexyltrimethoxysilane. The use of thexyltrimethoxysilane is particularly preferred.

The electron donor compound (c) is used in such an amount to give a molar ratio between the organoaluminum compound and said electron donor compound (c) of from 0.1 to 500, preferably from 1 to 300 and more preferably from 3 to 100.

The polymerization process can be carried out according to known techniques, for example slurry polymerization using as diluent an inert hydrocarbon solvent, or solution polymerization using for example the liquid butene-1 as a reaction medium. Moreover, it may also be possible to carry out the polymerization process in the gas-phase, operating in one or more fluidized or mechanically agitated bed reactors. The polymerization carried out in the liquid butene-1 as a reaction medium is highly preferred.

The polymerization is generally carried out at temperature of from 20 to 120° C., preferably of from 40 to 90° C. In the bulk polymerization the operating pressure is generally between 1 and 6 MPa preferably between 1.5 and 4 MPa. The polymerization can be carried out in one or more reactors that can work under same or different reaction conditions such as concentration of molecular weight regulator, monomer concentration, temperature, pressure etc. Working in more than one reactor under different conditions can lead to the preparation of polybutenes with different average Molecular Weight in the two reactors and therefore with a broader MWD optionally of bimodal type. Moreover, working in more than one reactor under different conditions has the advantage that the various polymerization step can be properly modulated so as to properly tailoring the properties of the final polymer.

In addition in order to make the catalyst particularly suitable for the polymerization step, it is possible to prepolymerize said catalyst in a prepolymerization step. Said prepolymerization can be carried out in liquid, (slurry or solution) or in the gas-phase, at temperatures generally lower than 100° C., preferably between 20 and 70° C. The prepolymerization step is carried out with small quantities of monomers for the time which is necessary to obtain the polymer in amounts of between 0.5 and 2000 g per g of solid catalyst component, preferably between 5 and 500 and, more preferably, between 10 and 100 g per g of solid catalyst component. The monomer used in the prepolymerization can be butene-1 and/or another α-olefin having from 2 to 10 carbon atoms. Preferably, the prepolymerization is carried out with propylene. In this case it is particularly preferable to carry out the prepolymerization with monomer amounts and polymerization times necessary to obtain a polypropylene content of from 0.5 to 20%, preferably from 1 to 15% based on the weight of the final butene-1 product. Although reactor blend are preferable in terms of homogeneity of the polymer, good results can be obtained by blending the butene-1 of the invention with an amount of propylene homopolymer or copolymer ranging from 0.5 to 20% by weight of the resulting composition.

The polybutenes of the invention can be used as such in all the applications for which polybutenes are generally employed. However, as it is known to the experts in this field, and as it can be easily determined by routine tests, it is possible to add further polymer components, additives (such as stabilizers, antioxidants, anticorrosives, nucleating agents, processing aids, etc.) and both organic and inorganic fillers which can give specific properties to the products of the invention.

The following examples are given in order to better illustrate the invention without limiting it.

CHARACTERIZATION

Determination of Isotactic Index (mmmm %). by $^{13}$C NMR

The measurement is carried out by preparing a 10% wt solution of the polymer in $C_2Cl_4D_2$ and recording the spectra at a temperature of 120° C. with a Bruker DPX 400 MHz instrument operating at 100.7 MHz under proton Waltz16 decoupling in FT mode, with 10 Khz spectral width, 90° pulse angle and 16 sec. puls repetition and 3600 scans. The assignment of the pentad signals in the region of branch methylene carbons was made according to Carbon-13 *NMR Spectral Assignment of Five Polyolefins Determined from the Chemical Shift Calculation and the Polymerization Mechanism*, T. Asakura and others, *Macromolecules* 1991, 24 2334–2340.

The experimental pentad distribution was fitted using the method described in *Two-site model analysis of $^{13}$C NMR of polypropylene polymerized by Ziegler-Natta catalyst with external alkoxysilane donors*, R. Chûjô, Y. Kogure, T. V äänänen, *Polymer*, 1994, 35, 339–342. The Isotactic Index is the value of mmmm pentad of the polymer generated from the "asymmetric bemoullian site" defined according to Chûjô.

Determination of Melt Index
ASTM D 1238 condition "E"

Determination of Melt Strength
The apparatus used in the Rheotens melt tension instrument model 2001, manufactured by Gottfert (Germany): the method consists of measuring in g the tensile strength of a strand of molten polymer operating at a specific stretch velocity. In particular, the polymer to be tested is extruded at 190° C. through a die with a capillary hole 22 mm long and 1 mm in diameter; the exiting strand is then stretched, by using a system of traction pulleys, at a constant acceleration of 0.012 cm/sec$^2$, measuring the tension until the breaking point. The apparatus registers the tension values of the strand (resistance in g) as a function of the stretching. The maximum tension value corresponds to the melt strength.

MWD Determination by Gel Permeation Chromatography (GPC)

This is determined using a Waters 150-C ALC/GPC system equipped with a TSK column set (type GMHXL-HT) working at 135° C. with 1,2-dichlorobenzene as solvent (ODCB) (stabilized with 0.1 vol. of 2,6-di-t-butyl p-cresole (BHT)) at flow rate of 1 ml/min. The sample is dissolved in ODCB by stirring continuously at a temperature of 140° C. for 1 hour. The solution is filtered through a 0.45 μm Teflon membrane. The filtrate (concentration 0.08–1.2 g/l injection volume 300 μl) is subjected to GPC. Monodisperse fractions of polystyrene (provided by Polymer Laboratories) were used as standard. The universal calibration for PB copolymers was performed by using a linear combination of the Mark-Houwink constants for PS (K=7.11×10$^{-5}$ dl/g; α=0.743) and PB (K=1.18×10$^{-4}$ dl/g; α=0.725)

Burst Stress Resistance
Determination is carried out according to ISO 1167: 1996 with water at 95° C. on pipes having an outer diameter of 22 mm.
Strength at Yield: ASTM D 638
Strength at Break: ASTM D 638
Elongation at Break: ASTM D 638
Flexural Modulus: ASTM D 790

EXAMPLES

Example 1

Preparation of Solid Catalyst Component
Into a 500 ml four-necked round flask, purged with nitrogen, 225 ml of TiCl$_4$ were introduced at 0° C. While stirring, 6.8 g of microspheroidal MgCl$_2$.2.7C$_2$H$_5$OH (prepared as described in Ex. 2 of U.S. Pat. No. 4,399,054 but operating at 3,000 rpm instead of 10,000) were added. The flask was heated to 40° C. and 4.4 mmoles of diisobutylphthalate were thereupon added. The temperature was raised to 100° C. and maintained for two hours, then stirring was discontinued, the solid product was allowed to settle and the supernatant liquid was siphoned off.

200 ml of fresh $TiCl_4$ were added, the mixture was reacted at 120° C. for one hour then the supernatant liquid was siphoned off and the solid obtained was washed six times with anhydrous hexane (6×100 ml) at 60° C. and then dried under vacuum. The catalyst component contained 2.8 wt % of Ti and 12.3 wt % of phthalate.

Bulk Polymerization of Butene-1

In a 4 liter autoclave, purged with nitrogen flow at 70° C. for one our, 75 ml of anhydrous hexane containing 7 mmols of $AlIBu_3$, 0.12 mmols of thexyltrimethoxysilane and 7 mg of solid catalyst component prepared as reported above were introduced in nitrogen flow at 30° C. The autoclave was closed. 0.15 Nl of hydrogen were added and then, under stirring, 1.3 Kg of liquid butne-1 were fed. The temperature was raised to 70° C. in five minutes and the polymerization was carried out at this temperature for 1.5 hours. Then, 8 Nl of hydrogen were fed and the temperature increased to 75° C. The polymerization was continued under these conditions for additional 30 minutes. After that time the reaction was stopped, the unreacted butene-1 was vented and the polymer was recovered and dried at 70° C. under vacuum for six hours. The polymerization activity was 50 Kg polymer/g catalyst. The final butene-1 product had the following characteristics:

Isotactic Index (% mmmm) 99
MWD: 5.1
Melt Strength: 3.85
MIE (g/10 min): 0,42

The results of the mechanical test to which the polybutene obtained was subjected are listed in table 1.

Example 2

In a 4 liter autoclave, purged with nitrogen flow at 70° C. for one our, 75 ml of anhydrous hexane containing 7 mmols of $AlIBu_3$, 0.175 mmols of thexyltrimethoxysilane and 7 mg of solid catalyst component prepared as reported above were introduced in nitrogen flow at 30° C. The autoclave was closed. 0.15 Nl of hydrogen were added and then, under stirring, 1.3 Kg of liquid butne-1 were fed. The temperature was raised to 75° C. in five minutes and the polymerization was carried out at this temperature for 1.5 hours. Then, 8 Nl of hydrogen were fed and, under the same temperature, the polymerization was continued for additional 30 minutes. After that time the reaction was stopped, the unreacted butene-1 was vented and the polymer was recovered and dried at 70° C. under vacuum for six hours. The polymerization activity was 40 Kg polymer/g catalyst. The final butene-1 product had the following characteristics:

Isotactic Index (% mmmm) 99%
MWD: 4.8
Melt Strength: 3.61
MIE=0.36

Comparison Example 1

The characteristics of the polybuetene-1 obtained according to the procedure reported in Example 1 of EP172961 having a Melt Strength of 2.5 and a Mw/Mn of 4.7 are reported in Table 1.

TABLE 1

|  |  | Example 1 | Example 2 | Comp. Ex. 1 |
|---|---|---|---|---|
| MIE |  | 0.42 | 0.36 | 0.4 |
| Strength at Yield | Mpa | 20.4 | 20.1 | 18 |
| Strength at Break | Mpa | 38.4 | 35.7 | 38 |
| Elongation at Break | % | 335 | 310 | 330 |
| Flexural Modulus | Mpa | 530 | 520 | 420 |
| 1000 Hrs Burst Stress | Mpa | 7.8 | 7.7 | 6.9 |

The invention claimed is:

1. 1-butene homopolymers, or copolymers containing up to 20% by weight of alpha olefins having from 2 to 10 carbon atoms other than 1-butene, characterized by the following properties:
   (i) a Molecular Weight Distribution (MWD) in terms of Mw/Mn, measured by GPC analysis, of lower than 6; and
   (ii) a melt strength higher than 2.8.

2. The 1-butene homo or copolymers according to claim 1 having an isotactic index expressed in terms of isotactic pentads (mmmm %) higher than 97.

3. The 1-butene homo or copolymers according to claim 2 having an isotactic index higher than 98.5.

4. The 1-butene homo or copolymers according to claim 1 having a MWD in the range 4–5.8.

5. The 1-butene homo or copolymers according to claim 4 having a MWD in the range 4.5–5.5.

6. The 1-butene homo or copolymers according to claim 1 having a melt strength higher than 3.

7. The 1-butene homo or copolymers according to claim 6 having a melt strength higher than 3.5.

8. The 1-butene copolymers according to claim 1 in which the alpha olefins are selected from the group consisting of ethylene, propylene and hexene-1.

9. The 1-butene copolymers according to claim 8 in which the content of said alpha olefins is from 2 to 15% by weight.

10. The 1-butene copolymers according to claim 9 in which the content of said alpha olefins is from 5 to 10% by weight.

11. The 1-butene homo or copolymers according to claim 1 having a MIE comprised in the range of from 10 to .0.1.

12. The 1-butene homo or copolymers according to claim 11 having a MIE comprised in the range of from 1 to 0.1.

13. The 1-butene homo or copolymers according to claim 1 containing from 0.5 to 20% by weight of polypropylene.

14. The 1-butene homo or copolymers according to claim 12 containing from 1 to 10% by weight of polypropylene.

15. The 1-butene homo or copolymer according to claim 12 having a MIE in the range from 0.2 to 0.6.

16. A process comprising preparing 1-butene homo or copolymers containing up to 20% by weight of alpha olefins having from 2 to 10 carbon atoms other than 1-butene characterized by the following properties:
   (i) a Molecular Weight Distribution (MWD) in terms of Mw/Mn, measured by GPC analysis, of lower than 6; and
   (ii) a melt strength higher than 2.8;
wherein the process is carried out in the presence of a stereospecific catalyst comprising (A) a solid component comprising a Ti compound and an internal electron-donor compound selected from phthalates, supported on $MgCl_2$; (B) an alkylaluminum compound and, (C) an external electron-donor compound.

17. The process according to claim 16 in which the external electron donor compound is thexyltrimethoxysilane.

18. The process according to claim 16 carried out in liquid monomer.

19. Manufactured articles obtained from butene 1-butene homo or copolymers containing up to 20% by weight of alpha olefins having from 2 to 10 carbon atoms other than 1-butene, characterized by the following properties:
   (i) a Molecular Weight Distribution (MWD) in terms of Mw/Mn, measured by GPC analysis, of lower than 6; and
   (ii) a melt strength higher than 2.8.

20. Pipes obtained from 1-butene homo or copolymers containing up to 20% by weight of alpha olefins having from 2 to 10 carbon atoms other than 1-butene, characterized by the following properties:
   (i) a Molecular Weight Distribution (MWD) in terms of Mw/Mn, measured by GPC analysis, of lower than 6; and
   (ii) a melt strength higher than 2.8.

* * * * *